United States Patent [19]

Suzuki et al.

[11] 3,839,039

[45] Oct. 1, 1974

[54] PROCESS FOR PRODUCING COLOR STRIPE FILTER

[75] Inventors: Masane Suzuki, Ohmiya; Enpei Nakamura, Tokyo, both of Japan

[73] Assignee: Fuji Shashin Koki Kabushiki Kaisha, Saitama-ken, Japan

[22] Filed: Oct. 25, 1973

[21] Appl. No.: 409,636

Related U.S. Application Data

[63] Continuation-in-part of Ser. No. 137,919, April 27, 1971, abandoned.

[30] Foreign Application Priority Data

Nov. 18, 1969 Japan ............................... 44-92398

[52] U.S. Cl. ........................ 96/38.3, 96/36, 353/84, 95/1 R

[51] Int. Cl. ............................................. G03c 5/00

[58] Field of Search ............ 96/38.3, 36, 36.2, 36.1; 252/300; 353/84; 355/32; 156/8; 95/1 R

[56] References Cited

UNITED STATES PATENTS

| | | | |
|---|---|---|---|
| 3,142,528 | 7/1968 | Stafford et al. | 355/32 |
| 3,215,030 | 2/1965 | Jordan | 355/32 |
| 3,388,735 | 6/1968 | Sayce | 96/38.3 |
| 3,443,915 | 5/1969 | Wood et al. | 96/38.3 |
| 3,508,982 | 4/1970 | Shearin | 96/38.3 |
| 3,576,630 | 4/1971 | Yanagan | 96/36.2 |
| 3,589,811 | 6/1971 | Berger | 355/32 |
| 3,606,521 | 9/1971 | Athey | 117/33.3 |
| 3,615,471 | 10/1971 | Lenoble et al. | 96/38.3 |

*Primary Examiner*—David Klein
*Assistant Examiner*—Edward C. Kimlin
*Attorney, Agent, or Firm*—Fleit, Gipple & Jacobson

[57] ABSTRACT

A monocolor stripe filter is produced by a process comprising exposing a transparent substrate having a photosensitive surface to light through a mask having stripes of transparent portions to form the image of said mask on said transparent substrate, converting said image into a metallic image, forming a dichroic layer uniformly on top of said metallic image and removing said dichroic layer together with said metallic layer. A plurality of the monocolor stripe filters of different color components produced in the manner described above are laminated to form a multicolor stripe filter.

6 Claims, 5 Drawing Figures

Masane Suzuki
Enpei Nakamura
INVENTORS

BY
Fleit, Gipple & Jacobson
ATTORNEYS

PROCESS FOR PRODUCING COLOR STRIPE FILTER

CROSS-REFERENCE TO RELATED APPLICATION

This application is a continuation-in-part of application Ser. No. 137,919, filed Apr. 27, 1971, now abandoned, for PROCESS FOR PRODUCING COLOR STRIPE FILTER.

BACKGROUND OF THE INVENTION

1. Field of the Invention

This invention relates to a process for producing a multicolor stripe filter for use in color television cameras, and more specifically to a process for producing a multicolor stripe filter for use in color television cameras of the type in which a stripe filter is disposed in the light path of one pick up tube of the chrominance channel system. The multicolor stripe filter referred to in this specification means a color stripe filter wherein two or three different color stripes are arranged in parallel and adjacent to each other. For instance, a multicolor filter used for a single color picture tube system comprises red-green, blue and black stripes arranged in order in side-by-side relation. The pitch of the stripes is normally about 10 lines/mm.

2. Description of the Prior Art

As a method of color television, a so-called three tube method has been known in which red, green and blue color lights separated by a color separation mirror or prism are focused on three separate pick up tubes. Further, as improvements over such method in which the number of pick up tubes is reduced, there has been proposed a single tube method in which chrominance signals of three colors are taken out by using a stripe filter having red, green and blue color stripes sequentially arranged thereon and one pick up tube, or a two tube method in which a chrominance signal of green color is taken out by using a pick up tube provided separately for the luminance channel system, and red and blue chrominance signals are taken out by using a stripe filter having red and blue stripes sequentially arranged thereon and one pick up tube.

The stripe filter used in these methods has the surface thereof finely divided, on which red, green and blue filters or red and blue filters are sequentially arranged. As a method of producing such prior art stripe filter, there has been known a method in which absorption type dye filters are arranged in side-by-side relation, a method in which a dichroic coating layer which has not been subjected to a hardening treatment and is called a soft coat, is cut into the shape of stripes by means of a diamond cutter, or a method in which stripes of dichroic coating layer are formed by photoetching.

However, any of these prior art methods has some defects. For instance, the method using absorption type dyes has the disadvantage that, while the stripe filter can be produced relatively easily, the light loss is great, and the method of producing the stripe filter by cutting has the disadvantage that, while the light loss is small, sharp stripes can hardly be obtained due to dullness of stripes or chips resulting from cutting because the dichroic coating layer is used, and further the durability of the coating layer is poor because the layer is a soft coating. The method employing photoetching has the disadvantage that the spectrum characteristic of the filter is degraded by the acidizing treatment which causes deterioration of the coating layer.

SUMMARY OF THE INVENTION

An object of the present invention is to overcome the disadvantages of the conventional method of producing a stripe filter described above, and to provide a process for producing a dichroic filter which minimizes the light loss and has excellent durability.

Another object of the invention is to provide a process for producing a stripe filter having good spectrum characteristic.

Still another object of the invention is to provide a process for producing a stripe filter, which is simple in procedure and does not require a special skill in the production.

Still another object of the invention is to provide a process for producing a stripe filter, which is capable of processing a large number of filters at a time and hence adapted for mass production.

In order to achieve the objects set forth above, a process for producing a stripe filter according to the present invention comprises imparting light sensitivity to the surface of a transparent substrate made of such a material as glass or plastics; exposing said surface to light through a mask which has stripes of transparent portions arranged at a predetermined pitch, thereby to record the image of said mask on said surface; replacing said image by an image of easily peelable deposited metal; depositing uniformly on said metallic image multiple layers having a predetermined dichroic characteristic; removing the dichroic layer together with the metal by peeling said metal, whereby a monocolor stripe filter is produced which has strips of the dichroic layers arranged in parallel at a predetermined pitch on the surface of the transparent substrate; and laminating the stripe filters of different colors produced in the manner described.

DESCRIPTION OF THE PREFERRED EMBODIMENTS

Figure 1:
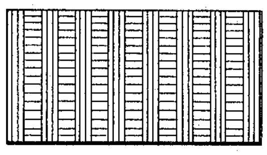
FIG. 1 is a front elevational view schematically showing the multicolor stripe filter according to the present invention.

The process of the instant invention will be described hereunder with reference to the accompanying drawings:

As shown in FIG. 1, the stripe filter to be produced by the process of the present invention has red stripes R and blue stripes B alternately arranged in parallel relation.

Figure 2:
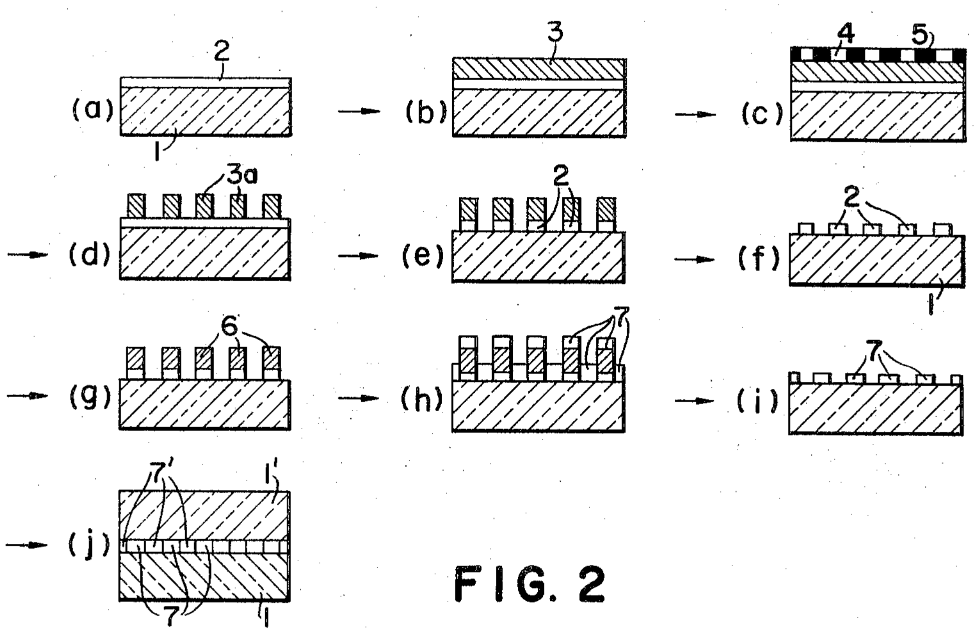
FIGS. 2 (*a*)–(*j*) are a set of cross-sectional views illustrating in sequence the steps of producing the multicolor stripe filter in one embodiment of the process of this invention.

An embodiment of the process for producing the filter according to the invention will be described hereunder with reference to FIGS. 2(*a*)–(*j*):

First of all, a conductive base 2 is formed by suitable chemical treatment on a transparent substrate 1 made of glass or plastics, as shown in FIG. 2(*a*), whereby the surface of said transparent substrate 1 is rendered conductive. The conductive base can be formed from silver or other metal which can be physically separated from the substrate such as by being peeled off and which can be etched or dissolved by acid or alkali. After the conductive base 2 is formed, a photosensitive material, usually a liquid, is coated and dried on the conductive base 2 to form a photosensitive layer 3 thereon as shown in FIG. 2(*b*) whereby the surface of said transparent base 1 is rendered photosensitive. The photosensitive material can be a conventional water soluble photoresist or other photosensitive material which can be dissolved and removed without dissolving the conductive base.

Figure 3:
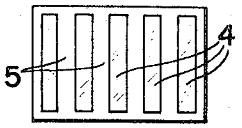
FIG. 3 is a front elevational view showing a master plate used in practicing the process of this invention.

An opaque mask 5 having transparent striped portions 4 arranged at a suitable pitch, as shown in FIG. 3, is prepared by using a precise machine such as a reproductive camera, and superposed on the photosensitive layer 3 in close contact therewith as shown in FIG. 2(*c*).

The photosensitive layer 3 is then exposed to light from a light source through the mask 5 (light source not shown). Thus, the photosensitive layer 3 is selectively exposed to light and the exposed portions 3*a* of the photosensitive layer 3 corresponding to the transparent portions 4 of the mask 5 are hardened. On the other hand, the non-exposed portions of the same remain $H_2O$ soluble and are removed as shown in FIG. 2(*d*). Then, portions of the conductive base 2 which are exposed between the exposed portions 3*a* of the photosensitive layer 3 upon removal of the non-exposed portions of the photosensitive layer 3 are removed by etching the conductive base 2 as shown in FIG. 2(*e*). Further, the exposed portions 3*a* of said photosensitive layer 3 remaining on the remaining portions of the conductive base 2 are removed as shown in FIG. 2(*f*). Any etching solution can be used which does not corrode the substrate. By the foregoing steps described mask element 10 is produced which comprises the transparent substrate 1 and the stripes of the conductive base 2*a* arranged in parallel thereon at a predetermined pitch. The mask element 10 thus produced is then dipped in a plating liquid to form a striped layer 6 of a metal, such as copper or nickel or other metal which forms a stronger bond with the conductive base than the conductive base forms with the substrate, deposited on the stripes of the conductive layer 2*a* by electrodeposition as shown in FIG. 2(*g*). In this case, no metal layer 6 is formed on that portion of the transparent substrate 1 from which the conductive layer 2 has been removed.

Then, dichroic layer 7 (which gives red component light for example) having a multiple layer of dielectric substances, such as $MgF_2$, ZnS, $CeF_3$, $CeO_2$, SiO, $ZrO_2$, $TiO_2$ and so forth, is uniformly formed over the transparent glass substrate 1 bearing the stripes of metal layer 6 by the process of vacuum evaporation well known in the art, as shown in FIG. 2(*h*). In this case, the height of the metal layer 6 from the surface of the transparent substrate 1 is made such that the dichroic layer 7 formed on the metal layer 6 will not be continuous with the dichroic layer 7 formed on the surface of the transparent substrate 1 but completely discontinuous therefrom.

Thereafter, the metal layer 6 is removed together with the dichroic layer 7 formed thereon and the conductive base 2, on which it is formed whereby only the stripes of the dichroic layer 7 which are in direct contact with the surface of the transparent substrate 1 remain on the surface of said transparent substrate as shown in FIG. 2(*i*). In this case, the conductive base 2 can be simply separated from the transparent substrate 1 because the bonding strength between the conductive base 2 and the metal layer 6 is stronger than that between the same and the transparent substrate 1.

As a result of the foregoing steps, the transparent substrate 1 has parallel stripes of the dichroic layer 7 arranged thereon in parallel relation at the predetermined pitch through which, for example, red component light transmits.

While in the embodiment described above the portions of the conductive base 2 which are not superposed by the exposed portions 3*a* of the photosensitive layer 3 are removed in the step of FIG. 2(*e*), it should be understood that the electrodeposition may be effected before the step of FIG. 2(*e*) to form the metal layer 6 at said portions and then the exposed portions 3*a* of the photosensitive layer 3 can be removed together with the conductive base 2 therebeneath to obtain stripes of metal layer 6 on the conductive base 2. (The stripes thus obtained are complementary with the stripes obtained by the foregoing steps as shown in FIG. 2(*g*).) This sequence is shown in FIGS. 5(*a*)–(*h*).

Figure 5:
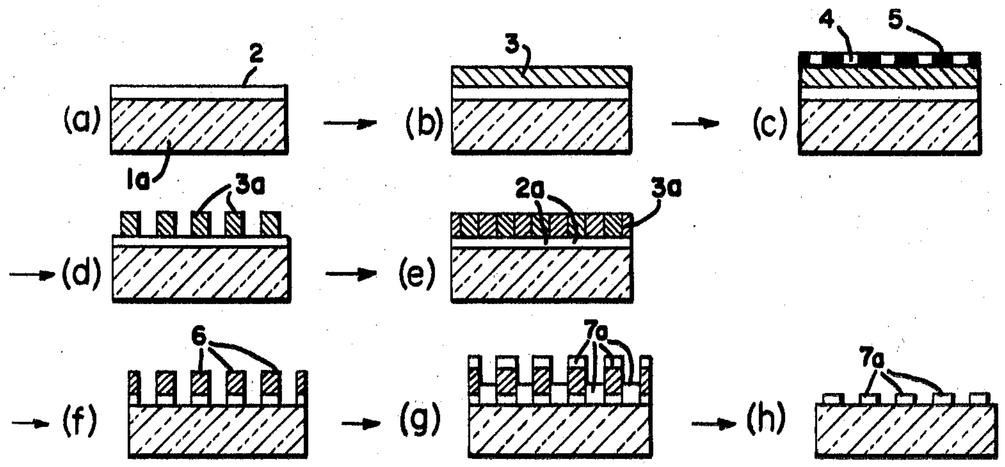
FIGS. 5(*a*)–(*h*) are a set of cross-sectional views illustrating in sequence the steps of producing the color stripe filter in yet another embodiment of the process of this invention.

Thereafter, the stripes of a dichroic layer 7*a* of a different characteristic (which passes green component light for example) are formed on the surface of a transparent substrate 1a as shown in FIGS. 5(*g*) and (*h*) in exactly the same manner as described above (except that the composition and material of the vacuum plating layer are different). The transparent substrate 1a having the stripes of the dichroic layer 7*a* thus formed thereon is superposed on the transparent substrate 1 in such a manner that said stripes of the dichroic layer 7*a* are alternately disposed between the stripes of the dichroic layer 7 on said transparent substrate 1 in side-by-side relation without a gap therebetween as shown in FIG. 2(*j*). Where a dichroic stripe filter having alternately arranged red, green and blue stripes is desired, three transparent substrates respectively having stripes of dichroic layer of said colors thereon are prepared in such a manner that the width of each stripe is the half of the width of the transparent portions, and said stripes of different color dichroic layers are combined in the manner described above.

Figure 4:
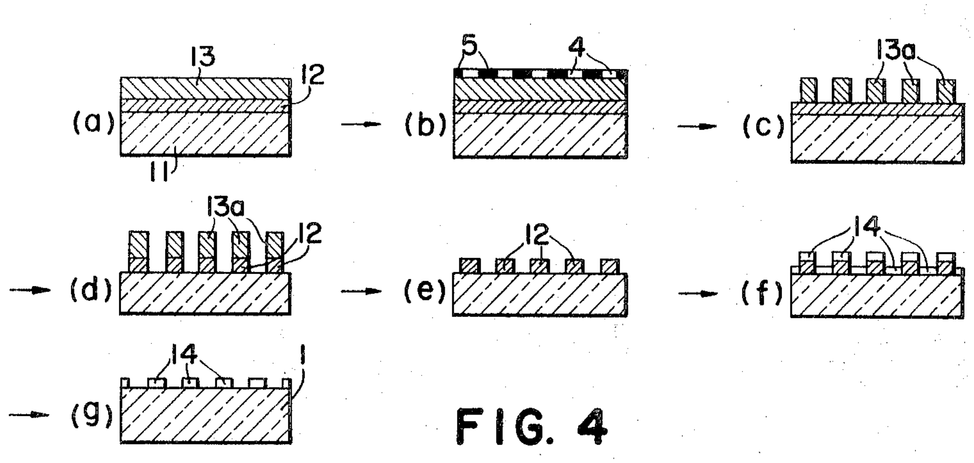
FIGS. 4(*a*)–(*g*) are a set of cross-sectional views illustrating in sequence the steps of producing the multicolor stripe filter in another embodiment of the process of this invention.

FIGS. 4(*a*)–(*g*) show in sequence the steps of another embodiment of the process according to the invention. In this embodiment, nickel or copper is directly deposited on a transparent substrate 11 by a non-electroplating method as shown in FIG. 4(*a*), to form a uniform metal layer 12 and then a photosensitive layer 13 of photo resist is formed on top of said metal layer 12 to impart photosensitivity to the surface of said transparent substrate. In this case, a parting layer is preferably formed beneath the metal layer 12 to facilitate the parting of said metal layer. Further, the metal layer 12 is formed in a thickness greater than a predetermined value, so as to facilitate the separation of a dichroic layer to be described later.

Then, the photosensitive layer 13 is exposed to light, with the mask 5 closely attached thereto, in the same manner as in the preceding embodiment as shown in FIG. 4(*b*), whereby the exposed portions 13*a* of said photosensitive layer are hardened and remained on the transparent substrate as shown in FIG. 4(*c*). Thereafter, only the exposed portions of the metal layer 12 are removed by an etching process as shown in FIG. 4(*d*) and subsequently the exposed portions 13*a* of the photosensitive layer 13 are also removed as shown in FIG. 4(*e*). A multiple dichroic layer is deposited in exactly the same manner as in the preceding embodiment to form stripes of a dichroic layer 14 uniformly over the surface of the transparent substrate and the surfaces of the stripes of the metal layer 12 as shown in FIG. 4(f). Then, the metal layer 12 is peeled, whereby the stripes of the dichroic layer 14 on said metal layer 12 are also removed, and thus a filter having the stripes of dichroic layer 14 arranged thereon at a predetermined pitch is produced. A plurality of filters produced in the manner described and having different dichroic characteristics are joined together to produce a multicolor stripe filter.

In this embodiment, the metal layer is formed by a different method from that used in the preceding embodiment, but ultimately, the metal layer is removed together with the dichroic layer thereon to leave on the surface of the transparent substrate only those portions of said dichroic layer which are in direct contact with said surface of the transparent substrate, as in the preceding embodiment.

What is claimed is:

1. A process for producing a multicolor stripe filter comprising the steps of forming a metal layer on the surface of the transparent substrate to form a conductive layer which can be physically separated from said substrate, applying a photosensitive layer which will harden on exposure to light on said conductive layer, exposing said photosensitive layer to said light through a mask having transparent stripes formed therein at a predetermined pitch to form a latent image, developing said latent image by removing the unexposed striped portions of said photosensitive layer thereby leaving the exposed striped portions of said photosensitive layer and selectively exposing the surface of portions of said conductive layer, etching said conductive layer to remove said portions of said conductive layer, thereby selectively exposing the surface of portions of said transparent substrate, removing the exposed portions of said photosensitive layer remaining on said conductive layer, forming a metal layer on the remaining conductive layer, which forms a stronger bond with the conductive layer than said conductive layer forms with said substrate, applying a dichroic material passing a desired color both on said metal layer and on said portions of said transparent substrate by vacuum evaporation, the thickness of said dichroic material being such that said dichroic material on said metal layer is not continuous with that on said transparent substrate, physically removing said striped metal layer together with the dichroic layer carried thereon and the conductive layer therebeneath, thereby forming a dichroic filter element having striped dichroic material passing said desired color, preparing a plurality of said dichroic filter elements having striped dichroic material passing different colors and joining said dichroic filter elements together with the stripes of dichroic material arranged adjacent to each other without a space therebetween thereby forming a multicolor stripe filter.

2. A process for producing a multicolor stripe filter comprising the steps of forming a metal layer on the surface of a transparent substrate to form a conductive layer which can be physically separated from said substrate, applying a photosensitive layer which will harden on exposure to light on said conductive layer, exposing said photosensitive layer to said light through a mask having transparent stripes formed therein at a predetermined pitch to form a latent image, developing said latent image by removing the unexposed striped portions of said photosensitive layer thereby leaving the exposed striped portions of said photosensitive layer and selectively exposing the surface of portions of said conductive layer, forming a metal layer on said portions of said conductive layer which forms a stronger bond with the conductive layer than said conductive layer forms with said substrate, removing the exposed portions of said photosensitive layer and the conductive layer therebeneath, thereby selectively exposing the surface of portions of said transparent substrate, applying a dichroic material passing a desired color both on said metal layer and on said portions of said transparent substrate by vacuum evaporation, the thickness of said dichroic material being such that said dichroic material on said metal layer is not continuous with that on said transparent substrate, physically removing said striped metal layer together with the dichroic layer carried thereon and the conductive layer therebeneath, thereby forming a dichroic filter element having striped dichroic material passing said desired color, preparing a plurality of said dichroic filter elements having striped dichroic material passing different colors and joining said dichroic filter elements together with the stripes of dichroic material arranged adjacent to each other without a space therebetween thereby forming a multicolor stripe filter.

3. A process for producing a multicolor stripe filter comprising the steps of forming a metal layer on the surface of a transparent substrate which can be physically separated from said substrate, applying a photosensitive layer which will harden on exposure to light on said metal layer, exposing said photosensitive layer to said light through a mask having transparent stripes formed therein at a predetermined pitch to form a latent image, developing said latent image by removing the unexposed striped portions of said photosensitive layer thereby leaving the exposed striped portions of said photosensitive layer and selectively exposing the surface of portions of said metal layer, etching said metal layer to remove said portions of said metal layer, thereby selectively exposing the surface of portions of said transparent substrate, removing the exposed portions of said photosensitive layer remaining on said metal layer, applying a dichroic material passing a desired color both on said metal layer and on said portions of said transparent substrate by vacuum evaporation, the thickness of said dichroic material being such that said dichroic material on said metal layer is not continuous with that on said transparent substrate, physically removing said striped metal layer together with the dichroic layer carried thereon, thereby forming a dichroic filter element having striped dichroic material passing said desired color, preparing a plurality of said dichroic filter elements having striped dichroic material passing different colors and joining said dichroic filter elements together with the stripes of dichroic material arranged adjacent to each other without a space therebetween forming a multicolor stripe filter.

4. A process for producing a monocolor stripe filter comprising the steps of forming a metal layer on the surface of a transparent substrate to form a conductive layer which can be physically separated from said substrate, applying a photosensitive layer which will harden on exposure to light on said conductive layer, exposing said photosensitive layer to said light through a mask having transparent stripes formed therein at a predetermined pitch to form a latent image, developing said latent image by removing the unexposed striped portions of said photosensitive layer thereby leaving the exposed striped portions of said photosensitive layer and selectively exposing the surface of portions of said conductive layer, etching said conductive layer to remove said portions of said conductive layer, thereby selectively exposing the surface of portions of said transparent substrate, removing the exposed portions of said photosensitive layer remaining on said conductive layer, forming a metal layer on the remaining conductive layer which forms a stronger bond with the conductive layer than said conductive layer forms with said substrate, applying a dichroic material passing a desired color both on said metal layer and on said portions of said transparent substrate by vacuum evaporation, the thickness of said dichroic material being such that said dichroic material on said metal layer is not continuous with that on said transparent substrate, and physically removing said striped metal layer together with the dichroic layer carried thereon and the conductive layer therebeneath, thereby forming a dichroic filter element having striped dichroic material passing said desired color.

5. A process for producing a monocolor stripe filter comprising the steps of forming a metal layer on the surface of a transparent substrate to form a conductive layer which can be physically separated from said substrate, applying a photosensitive layer which will harden on exposure to light on said conductive layer, exposing said photosensitive layer to said light through a mask having transparent stripes formed therein at a predetermined pitch to form a latent image, developing said latent image by removing the unexposed striped portions of said photosensitive layer thereby leaving the exposed striped portions of said photosensitive layer and selectively exposing the surface of portions of said conductive layer, forming a metal layer on said portions of said conductive layer which forms a stronger bond with the conductive layer than said conductive layer forms with said substrate, removing the exposed portions of said photosensitive layer and the conductive layer therebeneath, thereby selectively exposing the surface of portions of said transparent substrate, applying a dichroic material passing a desired color both on said metal layer and on said portions of said transparent substrate by vacuum evaporation, the thickness of said dichroic material being such that said dichroic material on said metal layer is not continuous with that on said transparent substrate, and physically removing said striped metal layer together with the dichroic layer carried thereon and the conductive layer therebeneath, thereby forming a dichroic filter element having striped dichroic material passing said desired color.

6. A process for producing a monocolor stripe filter comprising the steps of forming a metal layer on the surface of a transparent substrate which can be physically separated from said substrate, applying a photosensitive layer which will harden on exposure to light on said metal layer, exposing said photosensitive layer to said light through a mask having transparent stripes formed therein at a predetermined pitch to form a latent image, developing said latent image by removing the unexposed striped portions of said photosensitive layer thereby leaving the exposed striped portions of said photosensitive layer and selectively exposing the surface of portions of said metal layer, etching said metal layer to remove said portions of said metal layer, thereby selectively exposing the surface of portions of said transparent substrate, removing the exposed portions of said photosensitive layer remaining on said metal layer, applying a dichroic material passing a desired color both on said metal layer and on said portions of said transparent substrate by vacuum evaporation, the thickness of said dichroic material being such that said dichroic material on said metal layer is not continuous with that on said transparent substrate, and physically removing said striped metal layer together with the dichroic layer carried thereon, thereby forming a dichroic filter element having striped dichroic material passing said desired color.

* * * * *